(12) United States Patent
Tamura

(10) Patent No.: US 10,663,017 B2
(45) Date of Patent: May 26, 2020

(54) CLUTCH APPARATUS

(71) Applicant: NSK-WARNER K.K., Shinagawa-ku, Tokyo (JP)

(72) Inventor: Nariaki Tamura, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 60 days.

(21) Appl. No.: 15/863,433

(22) Filed: Jan. 5, 2018

(65) Prior Publication Data

US 2018/0216677 A1    Aug. 2, 2018

(30) Foreign Application Priority Data

Jan. 31, 2017    (JP) .................................. 2017-015314

(51) Int. Cl.
| | |
|---|---|
| *F16D 47/04* | (2006.01) |
| *F16D 41/12* | (2006.01) |
| *F16D 41/069* | (2006.01) |
| *F16D 23/12* | (2006.01) |
| *F16D 28/00* | (2006.01) |
| *F16D 25/06* | (2006.01) |
| *F16D 41/064* | (2006.01) |
| *F16D 41/04* | (2006.01) |
| *F16D 11/14* | (2006.01) |
| *F16D 11/00* | (2006.01) |

(52) U.S. Cl.
CPC ............. *F16D 47/04* (2013.01); *F16D 11/14* (2013.01); *F16D 23/12* (2013.01); *F16D 25/06* (2013.01); *F16D 28/00* (2013.01); *F16D 41/04* (2013.01); *F16D 41/064* (2013.01); *F16D 41/069* (2013.01); *F16D 41/12* (2013.01); *F16D 2011/008* (2013.01)

(58) Field of Classification Search
CPC ........ F16D 47/04; F16D 11/14; F16D 25/061; F16D 41/069; F16D 41/07
See application file for complete search history.

(56) References Cited

U.S. PATENT DOCUMENTS

| | | | | |
|---|---|---|---|---|
| 1,893,413 | A | * | 1/1933 | Hirsh ...................... F16D 41/04 192/110 R |
| 1,920,712 | A | * | 8/1933 | Pilcher .................... F16D 41/04 192/46 |
| 1,955,475 | A | * | 4/1934 | Sorensen ................ F16D 41/04 192/45.008 |
| 1,965,709 | A | * | 7/1934 | Morse .................... F16D 41/04 188/DIG. 2 |

(Continued)

FOREIGN PATENT DOCUMENTS

| | | |
|---|---|---|
| JP | 2000-199549 A | 7/2000 |
| JP | 2002-039224 A | 2/2002 |

OTHER PUBLICATIONS

Extended European Search Report dated Jul. 18, 2018, in European Patent Application No. 18151573.5.

*Primary Examiner* — Stacey A Fluhart
(74) *Attorney, Agent, or Firm* — SGPatents PLLC

(57) ABSTRACT

An object is to provide a compact and lightweight clutch apparatus by using a mechanical clutch. A clutch apparatus includes a one-way clutch and a mechanical clutch arranged in parallel in an axial direction, in which the mechanical clutch is movably retained in the axial direction, and when the mechanical clutch moves in the axial direction due to pushing means, the mechanical clutch engages with an end surface of an inner wheel of the one-way clutch.

7 Claims, 3 Drawing Sheets

(56) References Cited

U.S. PATENT DOCUMENTS

| | | | |
|---|---|---|---|
| 2,005,389 A | | 6/1935 | Pilcher |
| 2,684,140 A | | 7/1954 | Warn |
| 4,223,772 A | * | 9/1980 | Telford .............. B60K 17/3515 |
| | | | 192/36 |
| 4,711,332 A | * | 12/1987 | Schuster ............ B60K 17/3505 |
| | | | 192/36 |
| 5,586,455 A | * | 12/1996 | Imai ........................ D06F 37/40 |
| | | | 68/12.02 |

* cited by examiner

CLUTCH APPARATUS

BACKGROUND OF THE INVENTION

Field of the Invention

The present invention relates to a clutch apparatus used in an automatic transmission disposed on vehicles, and in particular, to a clutch apparatus on which two engaging elements are arranged in parallel in an axial direction.

Description of the Related Art

In Japanese Patent Application Laid-Open No. 2000-199549, an automatic transmission, in which a clutch apparatus comprising a one-way clutch for backstop and a wet multi-plate clutch arranged in parallel with the one-way clutch is integrated, is disclosed. During speed shifting of the automatic transmission, it is necessary to shift the wet multi-plate clutch, and the one-way clutch is used to control the shift. Both the one-way clutch and the wet multi-plate clutch are joined to the same planetary carrier, and external peripheries of these clutches are fixed inside a transmission case of the automatic transmission by a spline.

As disclosed in Japanese Patent Application Laid-Open No. 2002-39224, such clutch apparatus can, by actuating a piston against a return spring, engage an inner disk and an outer disk of an oil pressure friction element by friction and stop a joined transmission mechanism component.

However, as torque capacity of the automatic transmission increases, the wet multi-plate clutch develops toward large scale, so a problem exists that the mountability of the clutch apparatus becomes deteriorated. Furthermore, weight of the clutch apparatus also increases. In addition, another problem also exists that when the wet multi-plate clutch is unfastened (idling), due to stirring resistance of lubricant oil in-between the clutch plates, drag torque is generated and fuel efficiency is reduced.

SUMMARY OF THE INVENTION

Therefore, an object of the present invention is to provide a compact and lightweight clutch apparatus by using a mechanical clutch.

To attain the above object, a clutch apparatus of the present invention, includes a one-way clutch and a mechanical clutch arranged in parallel in an axial direction, wherein the mechanical clutch is movably retained in the axial direction, and when the mechanical clutch moves in the axial direction due to pushing means, the mechanical clutch engages with an end surface of an inner wheel of the one-way clutch.

According to the present invention, the compact and lightweight clutch apparatus can be provided by using the mechanical clutch. Furthermore, because no wet multi-plate clutch is used, generation of drag torque caused by stirring resistance of lubricant oil can be avoided, and fuel efficiency can be improved.

Further features of the present invention will become apparent from the following description of exemplary embodiments with reference to the attached drawings.

DESCRIPTION OF THE EMBODIMENTS

Figure 1A:
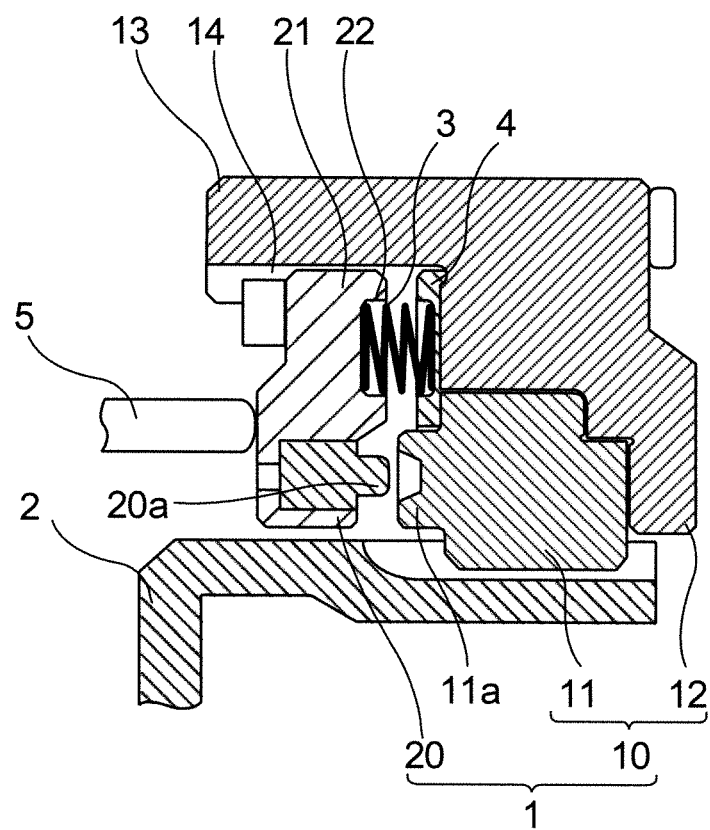
FIG. 1A is a partial cross-sectional view of an unfastened state of a clutch apparatus 1 of the present invention.

Preferred embodiments of the present invention are described in detail with reference to the accompanying drawings in the following part.

Embodiments of the present invention are described in detail with reference to the accompanying drawings in the following part. Moreover, the same component is represented by the same symbol in the drawings.

Figure 1B:
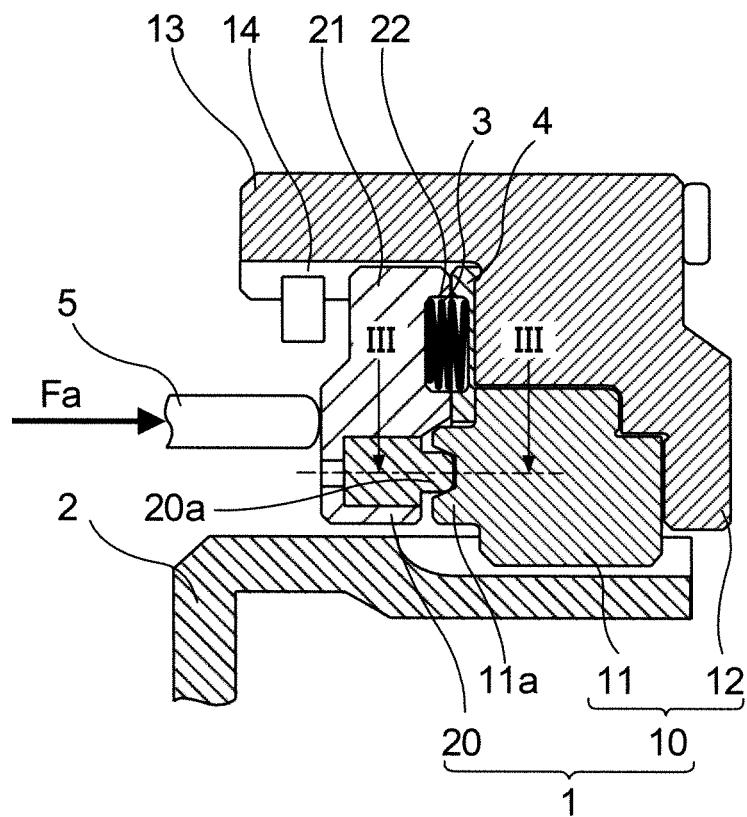
FIG. 1B is a partial cross-sectional view of a fastened state of the clutch apparatus 1 of the present invention.
Figure 2:
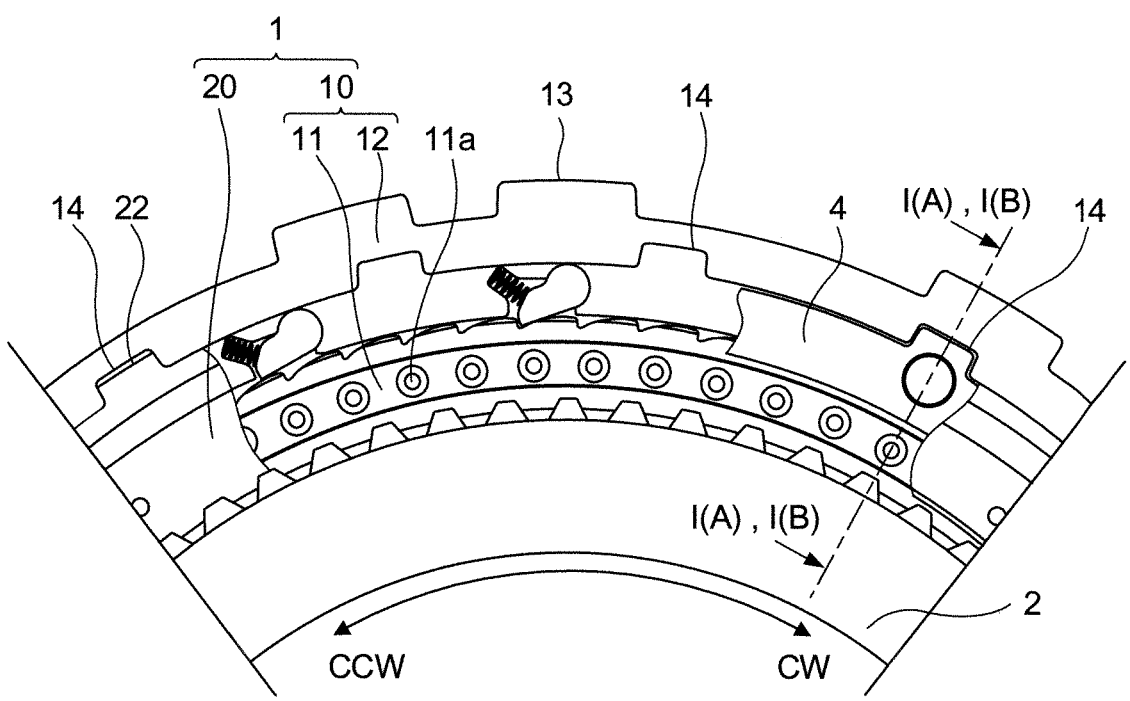
FIG. 2 is a front view of the clutch apparatus 1 of the present invention observing from an inner wheel 11 side of a one-way clutch 10.

FIG. 1A is a partial cross-sectional view obtained by cutting a clutch apparatus 1 according to the embodiments of the present invention along a cutting line I(A), I(B)-I(A), I(B) in FIG. 2, and shows an unfastened state of the clutch apparatus 1. FIG. 1B is also a partial cross-sectional view and shows a fastened state of the clutch apparatus 1. FIG. 2 is a front view of the clutch apparatus 1 according to the embodiments of the present invention observing from an inner wheel 11 side of a one-way clutch 10, and shows a part of a mechanical clutch 20.

The clutch apparatus 1 according to the embodiments of the present invention is configured by arranging engaging elements, for example, the one-way clutch 10 and the mechanical clutch 20 in parallel in an axial direction. Such clutch apparatus 1 with two engaging elements arranged in parallel in the axial direction is used, for example, in an automatic transmission disposed on a vehicle. In the automatic transmission, the one-way clutch 10 is used for backstop and the mechanical clutch 20 acts as a brake by engaging with the one-way clutch 10.

First, a structure of the one-way clutch 10 is described in accordance with FIG. 1A. The one-way clutch 10 comprises an outer wheel 12 and the inner wheel 11 disposed concentrically with the outer wheel 12 at an inner side of the outer wheel 12. An outer peripheral spline 13 is arranged on an external periphery of the outer wheel 12 of the one-way clutch 10. Then, by engaging the outer peripheral spline 13 inside a transmission case that is not shown, the outer wheel 12 of the one-way clutch 10 is fixed. On an end surface of the inner wheel 11 of the one-way clutch 10, an engaged section (an engaging concave portion 11a) which is engaged with the mechanical clutch 20 described below is disposed. A carrier 2 is connected to an inner side of the inner wheel 11 of the one-way clutch 10. The one-way clutch 10 acts in such a way that it does not rotate clockwise but idles counter-clockwise. The clutch apparatus 1 according to the embodiments of the present invention uses a ratchet one-way clutch, which is referred to as the one-way clutch 10 hereinafter.

Next, a structure of the mechanical clutch 20 is described. The mechanical clutch 20 is arranged parallel to the one-way clutch 10 in the axial direction and has an engaging section (an engaging convex portion 20a) which mechanically engages with the engaged section of the one-way clutch 10. That is, unlike conventional wet multi-plate clutches, the mechanical clutch 20 has a mechanical engaging mechanism which does not use a friction clutch. An external peripheral section 21 of the mechanical clutch 20 is engaged with an internal peripheral spline 14 disposed on an internal periphery of the outer wheel 12 of the one-way clutch 10, and the mechanical clutch 20 is movably retained in the axial direction.

Return springs 3 are disposed between the one-way clutch 10 and the mechanical clutch 20, one side of each return spring 3 contacts with a spring base 22 formed on an end surface of the mechanical clutch 20, and the other side contacts with a spring retainer 4. As shown in FIG. 2, the spring retainer 4 is ring-shaped and engages with the internal peripheral spline 14 disposed on the internal periphery of the outer wheel 12 of the one-way clutch 10.

Next, the engaging mechanism of the one-way clutch 10 and the mechanical clutch 20 is described. As shown in FIG. 1A, the engaged section is disposed on the end surface of the inner wheel 11 of the one-way clutch 10. The engaging section is disposed on the end surface of the mechanical clutch 20 opposite to the inner wheel 11 of the one-way clutch 10. When the pushing means connected with the mechanical clutch 20, for example, a piston 5 is driven rightward as shown in FIG. 1B, the mechanical clutch 20 is pushed toward the axial direction (the right). Then, the mechanical clutch 20 moves toward the axial direction (the right), and the engaging section of the mechanical clutch 20 engages with the engaged section of the one-way clutch 10. In this way, the clutch apparatus 1 is fastened by engaging the one-way clutch 10 with the mechanical clutch 20.

In addition, when the piston 5 is relieved of driving, due to repulsion force of the return springs 3 disposed between the one-way clutch 10 and the mechanical clutch 20, the mechanical clutch 20 moves toward the axial direction (the left). Then, the engagement of the one-way clutch 10 with the mechanical clutch 20 is immediately relieved. In this way, the clutch apparatus 1 is unfastened by relieving the engagement of the one-way clutch 10 with the mechanical clutch 20.

As shown in FIG. 2, a plurality of engaged sections disposed on the end surface of the inner wheel 11 of the one-way clutch 10 are circularly disposed. Similarly, a plurality of engaging sections disposed on the mechanical clutch 20 are circularly disposed (not shown).

Next, basic movement of the clutch apparatus 1 according to the embodiments of the present invention is described. In FIG. 2, when the carrier 2 rotates in a clockwise direction (CW), the one-way clutch 10 acts to lock the rotation. On one hand, as to the mechanical clutch 20, when the piston 5 is off, the mechanical clutch 20 is not engaged with the one-way clutch 10, so the rotation is still locked by the one-way clutch 10. On the other hand, when the piston 5 is on, the rotation is similarly locked.

When the carrier 2 rotates in a counter-clockwise direction (CCW), the one-way clutch 10 idles and the rotation is unlocked. On one hand, as to the mechanical clutch 20, when the piston 5 is off, the mechanical clutch is not engaged with the one-way clutch 10, so the rotation is unlocked. On the other hand, when the piston 5 is on, the mechanical clutch 20 is engaged with the one-way clutch 10, so the rotation is locked.

The above basic movement is that when the automatic transmission is at a first speed, the one-way clutch 10 acts and locks the rotation, and when the automatic transmission is at a first speed or reverse, the mechanical clutch 20 moves due to the driving of the piston (turned ON state) and brakes the idling of the one-way clutch 10. The mechanical clutch 20 acts as a so-called brake. The basic movement is shown in Table 1 below.

TABLE 1

| | Rotating direction of carrier 2 | | |
|---|---|---|---|
| Engaging elements | Clockwise direction | Counter-clockwise direction | Note |
| One-way clutch 10 | Lock (act) | Idle | Lock (act) at first speed |
| Mechanical clutch 20 (OFF) | Lock | Idle | Act at first speed or reverse |
| Mechanical clutch 20 (ON) | Lock (act) | Lock (act) | Act at first speed or reverse |

Embodiments

Figure 3:
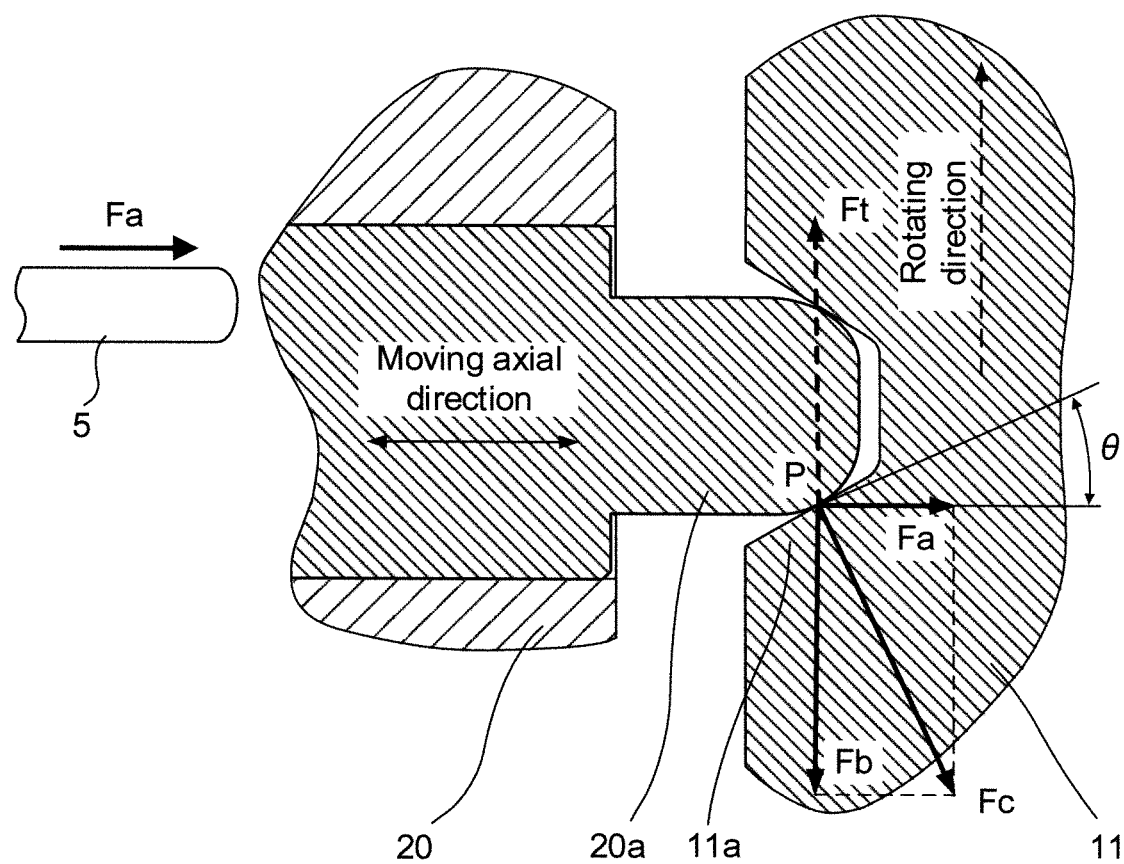
FIG. 3 is a partial cross-sectional view showing an engaging mechanism of the clutch apparatus 1 of the present invention.

The embodiments of the present invention are described in accordance with FIG. 1B and FIG. 3. FIG. 3 is a partial cross-sectional view along a cross-sectional line in FIG. 1B and shows the engaging mechanism of the clutch apparatus 1 observing from an arrow direction. The engaging section of the mechanical clutch 20 is the engaging convex portion 20a and is pin-shaped, and R chamfering is performed on the engaging convex portion 20a. In addition, the engaged section disposed on the end surface of the inner wheel 11 of the one-way clutch 10 is the engaging concave portion 11a and is frustum-shaped. When the piston 5 acts and the mechanical clutch 20 moves rightward, the pin-shaped engaging convex portion 20a engages with the frustum-shaped engaging concave portion 11a. However, a head of the pin-shaped engaging convex portion 20a on which the R chamfering is performed does not abut to a bottom of the engaging concave portion 11a.

The piston 5 is driven in the axial direction by an actuator driven by oil pressure, electricity or the like, and thrust Fa of the piston 5 is applied to the mechanical clutch 20. When the mechanical clutch 20 moves rightward and the engaging convex portion 20a engages with the engaging concave portion 11a, in the engaging point P, the thrust Fa is transmitted to the inner wheel 11 of the one-way clutch 10 in the axial direction. Due to the frustum shape (angle θ of the axial direction), the thrust Fa acts on the inner wheel 11 in the form of a resultant force Fc formed with a component force Fb.

The engaging mechanism of the clutch apparatus 1 according to the embodiments of the present invention implements the fastening function by counteracting a rotation force Ft of the carrier 2 with the component force Fb forming the resultant force Fc of the piston 5. The fastening conditions of the clutch apparatus 1 according to the embodiments of the present invention shall satisfy the following relations.

$Fc = Fa/\sin\theta$ $Fb = Fc \times \cos\theta$ $Fc > Ft$

Then, the thrust Fa of the piston 5, the number N of the engaging convex portion 20a, the frustum shape of the engaging concave portion 11a (the angle θ of the axial direction), and the repulsion force of the return spring 3 are properly selected with consideration of the rotation force Ft of the carrier 2 and mechanical properties of the pin-shaped engaging convex portion 20a.

The clutch apparatus 1 according to the embodiments of the present invention becomes, by using the mechanical clutch 20, a compact and lightweight structure with reduced axial direction size. In addition, because wet multi-plate clutches are not used, generation of drag torque caused by the stirring resistance of the lubricant oil can be avoided, and fuel efficiency can be improved. Furthermore, excellent function, operation and effect that torque capacity are ensured by engagement of the convex and concave is implemented.

Modified Example

In the embodiments of the present invention, the engaged section of the one-way clutch 10 assumes the shape of the engaging concave portion 11a, but in the example, the engaged section is a convex portion, and the engaging section of the mechanical clutch 20 is a concave portion. Moreover, the piston 5 may be driven by oil pressure or by electromagnetic force, and so on.

Application Example

In the clutch apparatus 1 according to the embodiments of the present invention, the ratchet one-way clutch is used, but a sprag type of one-way clutch or a roller type of one-way clutch can also be applied.

The present invention is described above in detail in accordance with preferred embodiments and examples, but the present invention is not limited to these specific embodiments, and detailed structures can be altered and implemented within the scope of claims. Moreover, there is no special limit on apparatus using the clutch apparatus 1 according to the embodiments and examples of the present invention, and the clutch apparatus 1 can be used in the automatic transmission.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-015314, filed Jan. 31, 2017, which is hereby incorporated by reference herein in its entirety.

What is claimed is:

1. A clutch apparatus, comprising a one-way clutch and a mechanical clutch arranged in parallel in an axial direction, wherein the mechanical clutch is movably retained in the axial direction, and when the mechanical clutch moves in the axial direction due to a pushing member, the mechanical clutch engages with an end surface of an inner wheel of the one-way clutch, engaging sections are circularly disposed on the mechanical clutch, and engaged sections engageable with the engaging sections are circularly disposed on the inner wheel of the one-way clutch, the engaging sections and the engaged sections include engaging convex portions and engaging concave portions, the engaging concave portions engage with the engaging convex portions, the engaging concave portions are frustum-shaped, and where $\theta$ is an angle in an axial direction of the frustum-shape, a thrust $Fa$ of the pushing member, a rotation force $Ft$, a component force $Fb$, and a resultant force $Fc$ of the pushing member satisfy the following relations:

$$Fc = Fa/\sin\theta$$

$$Fb = Fc \times \cos\theta$$

$$Fc > Ft.$$

2. The clutch apparatus according to claim 1, wherein when the mechanical clutch engages with the one-way clutch, idling of the one-way clutch is braked.

3. The clutch apparatus according to claim 1, wherein the one-way clutch is any one of a ratchet one-way clutch, a sprag one-way clutch, or a roller one-way clutch.

4. The clutch apparatus according to claim 1, wherein the pushing member is a piston driven by an actuator using oil pressure or electricity.

5. The clutch apparatus according to claim 1, wherein each engaging section is an engaging convex portion, and each engaged section is an engaging concave portion that engages with a corresponding engaging convex portion.

6. An automatic transmission of a vehicle carrying the clutch apparatus according to claim 1.

7. The clutch apparatus according to claim 1, wherein the engaging concave portions are circular as viewed in the axial direction of the clutch apparatus.

* * * * *